June 19, 1928.
K. B. POOL
COTTON BLOCKER
Filed March 26, 1927
1,673,844
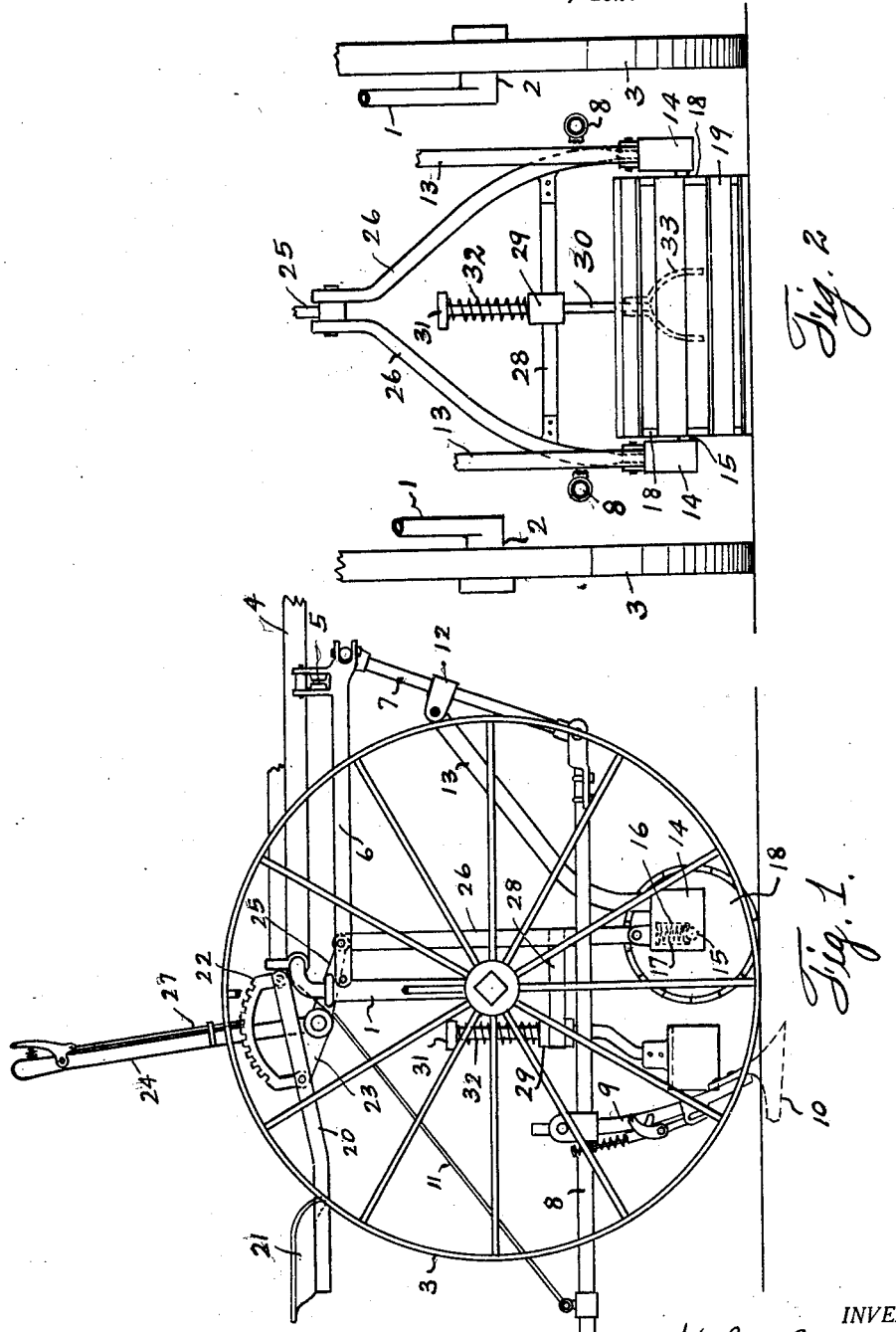
INVENTOR.
Kohl B Pool
BY Hardway Cathey
ATTORNEYS.

Patented June 19, 1928.

1,673,844

UNITED STATES PATENT OFFICE.

KOHL B. POOL, OF HOUSTON, TEXAS, ASSIGNOR OF FIFTY-ONE PER CENT TO SOUTH TEXAS IMPLEMENT AND MACHINERY COMPANY, OF HARRIS COUNTY, TEXAS, A CORPORATION OF TEXAS.

COTTON BLOCKER.

Application filed March 26, 1927. Serial No. 178,543.

This invention relates to new and useful improvements in a cotton blocker.

One object of the invention is to provide an implement of the character described, specially designed for the purpose of thinning out the plants in a row and simultaneously cultivating a row and has been specially designed to thin out and cultivate rows of cotton plants.

Another object of the invention is to provide, in an implement of the character described, a shield or protector for small plants which may be used when desired to prevent the plants in the row from being covered with earth from the cultivator shares.

A still further feature of the invention resides in the provision of an attachment which may be readily applied to the conventional type of cultivator for the purpose of blocking or thinning out the plants in a row.

With the above and other objects in view the invention has particular relation to certain novel features of construction, operation and arrangement of parts, an example of which is given in this specification and illustrated in the accompanying drawings, wherein:—

Figure 1 shows a side elevation of the implement, and

Figure 2 shows a fragmentary front elevation thereof.

Referring now more particularly to the drawings, wherein like numerals of reference designate similar parts in each of the figures, the numeral 1 designates the cultivator axle which is of an inverted U-shaped form and which has the outwardly turned spindles 2, 2, on which the ground wheels 3 are rotatably mounted. Fixed to the upper part of the axle there is a forwardly extending tongue 4, provided for the attachment of draft animals to the implement. In front of the ground wheels and underneath the tongue there is a cross bar 5 and fastened to the respective side arms of the axle are the side members, as 6, of the framework, whose forward ends are anchored to the cross bar 5. Fastened to the forward end of the respective side members 6 are the hanger rods as 7, whose lower ends are connected to the forward ends of the rearwardly extending beams 8 and clamped to these respective beams and depending therefrom are the stocks 9 whose lower ends have conventional shares 10 fastened thereto, said shares being arranged to pass on opposite sides of the row to be cultivated. The rear ends of the beams 8 are supported from the axle by means of suitable guy rods, as 11. Each hanger rod 7 is provided with the clamp 12 which is secured thereto and the upper end of the hangers 13 are pivotally connected to the respective clamps 12. The lower ends of these hangers carry the bearing blocks 14, 14. There is a transverse shaft 15, whose ends are rotatably mounted in suitable vertical bearings 16 in the respective blocks 14 and coil springs, as 17, are mounted in said bearings above the respective ends of the shaft 15. There is a drum formed of end discs as 18 which are spaced apart and fixed on the shaft 15 and fastened to the margins of these discs 18 and spaced apart are the slats 19. These slats are held yieldingly against the ground surface by the pressure of the springs 17. Mounted on the axle 1 and extending rearwardly therefrom there is a seat support 20 carrying the driver's seat 21 and secured to the support 20 there is a segmental rack 22 and depending from said support there is a bearing 23, to which the lower end of the manual lever 24 is pivoted and extending forwardly from the lower end of said lever there is an arm 25 whose forward end is pivotally connected to the upper end of the lift yoke composed of the arms 26, 26, whose lower ends are pivotally connected to the respective bearing members 14, 14. A dog 27 is mounted on the lever 24 and adapted to engage the rack member 22 to hold the lever 24 in a predetermined position, said dog being operable in the conventional manner. Through the mechanism described the blocking drum may be elevated and lowered.

In operation, as the cultivator moves along the row, the drum will roll along on the surface of the ground and the slats 19 being spaced apart some of the plants in the row will be crushed and others left standing and the following shares will throw the plowed earth over the crushed plants and the standing plants will be simultaneously cultivated.

There is an arcuate rearwardly curved supporting bar 28 whose respective ends are fastened to the arms 26 and this bar 28 has a central bearing 29 through which the vertical guard rod 30 works. The upper end of this rod has a head 31 and surrounding said rod and interposed between the head 31 and the bearing 29 there is a coil spring 32. The lower end of the rod 30 carries the arcuate guard 33 which is normally held elevated by the spring 32. In case any of the plants left in the row are so small as to be liable to be covered by the shares the operator may apply his foot to the head 31 and force the guard 33 downwardly into position to shield the plants to be protected and the guard, when in such depressed position, will ward off the earth thrown up by the shares.

What I claim is:—

1. An implement of the character described including an inverted U-shaped axle, ground wheels supporting the axle, a forwardly extending tongue attached to the upper part of the axle, a cross bar secured to the tongue, side members secured at their front ends to said cross bar and at their rear ends to the side arms of the axle, hanger rods whose upper ends are connected to the forward ends of said side members, a clamp secured to each hanger rod, hangers pivotally connected to said clamps, a gearing block carried by the lower end of each hanger, a vertical bearing in each block, a transverse shaft whose respective ends are rotatably mounted in said bearings, a yieldable seat in each bearing above said shaft, a drum formed of end discs spaced apart and fixed to said shaft, spaced slats secured to said discs, a lift yoke having side arms connected to said blocks, means for elevating and lowering said yoke and means securing the yoke at a predetermined position.

2. An implement of the character described including an axle, ground wheels supporting the axle, a forwardly extending draft member attached to the axle, a cross bar secured to said draft member, side members secured at their front ends to said cross bar and at their rear ends to said axle, hanger rods connected to and depending from the forward ends of said side members, a hanger pivotally connected at its upper end to each hanger rod, a bearing member carried by the lower end of each hanger, a transverse shaft whose ends are rotatably mounted in said respective bearing members, a drum fixed on said shaft, said drum having plant spaces, a lift yoke having side arms connected to the shaft bearings and means for elevating and lowering said yoke.

3. An implement of the character described including an axle, ground wheels supporting the axle, a forwardly extending draft member attached to the axle, a cross bar secured to said draft member, side members secured at their front ends to said cross bar and at their rear ends to said axle, hanger rods connected to and depending from the forward ends of said side members, a hanger pivotally connected, at its upper end to each hanger rod, a bearing member carried by the lower end of each hanger, a transverse shaft whose ends are rotatably mounted in said respective bearing members, a drum fixed on said shaft, said drum having plant spaces, a yoke for supporting the drum, said yoke having side arms connected to the shaft bearings and means for elevating and lowering said yoke, said elevating and lowering means including a support carried by the axle, a segmental rack secured to said support, a manual lever pivotally connected to said support, an arm carried by said lever pivotally connected to said yoke and a manually controlled dog carried by said manual lever and engageable with said rack.

In testimony whereof I have signed my name.

KOHL B. POOL.